United States Patent

Katsube et al.

[11] Patent Number: 5,930,259
[45] Date of Patent: Jul. 27, 1999

[54] PACKET TRANSMISSION NODE DEVICE REALIZING PACKET TRANSFER SCHEME AND CONTROL INFORMATION TRANSFER SCHEME USING MULTIPLE VIRTUAL CONNECTIONS

[75] Inventors: Yasuhiro Katsube, Kanagawa-ken; Kenichi Nagami, Chiba-ken, both of Japan

[73] Assignee: Kabushiki Kaisha Toshiba, Kawasaki, Japan

[21] Appl. No.: 08/701,985

[22] Filed: Aug. 23, 1996

[30] Foreign Application Priority Data

Aug. 25, 1995 [JP] Japan ................................ P07-216988
Aug. 25, 1995 [JP] Japan ................................ P07-216989

[51] Int. Cl.[6] .................................................. H04L 12/56
[52] U.S. Cl. ........................... 370/409; 370/390; 370/392
[58] Field of Search ..................................... 370/229, 238, 370/363, 368, 371, 374, 378, 383, 389, 390, 392, 395, 397, 399, 400, 401, 402, 409; 379/133, 134, 137, 243, 244

[56] References Cited

U.S. PATENT DOCUMENTS

| 5,291,477 | 3/1994 | Liew ....................................... 370/238 |
| 5,353,283 | 10/1994 | Tsuchiya ............................... 370/392 |
| 5,361,256 | 11/1994 | Doeringer et al. ..................... 370/390 |
| 5,452,296 | 9/1995 | Shimizu ................................. 370/399 |
| 5,541,927 | 7/1996 | Kristol et al. ........................... 370/408 |
| 5,612,959 | 3/1997 | Takase et al. .......................... 370/390 |
| 5,649,108 | 7/1997 | Spiegel et al. ......................... 370/400 |

OTHER PUBLICATIONS

Y. Katsube et al., "Router Architecture Extensions for ATM: Overview<draft–katsube–router–atm–overview–00.txt>.," Internet Draft. Mar. 1, 1995., pp. 1–21.

Primary Examiner—Hassan Kizou
Assistant Examiner—Soon-Dong Hyun
Attorney, Agent, or Firm—Foley & Lardner

[57] ABSTRACT

A packet transmission node which realizes a packet transfer scheme in which a plurality of virtual connections for different qualities of service are set up in correspondence to a multicast destination address, and output virtual connection identifiers are stored in correspondence to destination addresses in a routing table, so that a packet is transferred to output virtual connections determined by referring to the routing table according to a destination address of a packet. A packet transmission node also realizes a control information transfer scheme in which different output virtual connections are set up for a user data packet and a control packet having an identical destination address, and output virtual connection identifiers are stored in correspondence to destination addresses and upper layer protocol identifiers in a routing table, so that a packet is transferred to an output virtual connection determined by referring to the routing table according to a destination address and an upper layer protocol identifier of a packet.

34 Claims, 11 Drawing Sheets

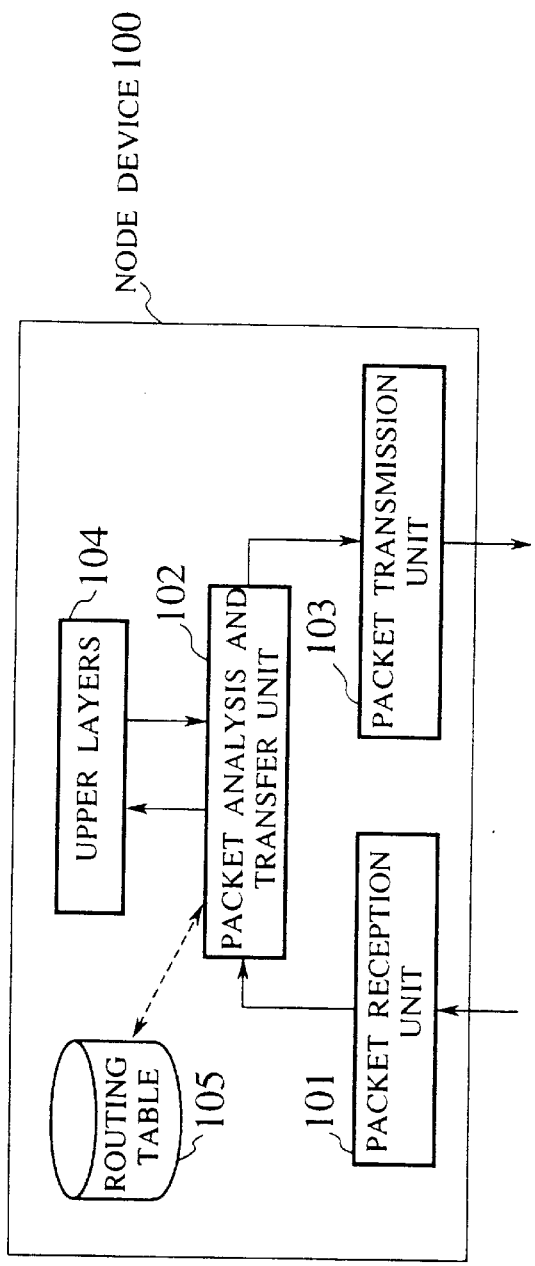

N: VIRTUAL CONNECTION ORIENTED NETWORK

| DESTINATION IP ADDRESS | PROTOCOL ID | OUTPUT INTERFACE | NEXT HOP NODE ADDRESS | VPI/VCI |
|---|---|---|---|---|
| a.b.c.d | TCP | 1 | p.q.r.s | 100/200 |
| a.b.c.d | RSVP | 1 | p.q.r.s | 100/201 |
| p.q.x.y | UDP | 1 | p.q.r.s | 100/100 |
| p.q.x.y | RSVP | 1 | p.q.r.s | 100/201 |
| e.f.g.h | UDP | 1 | p.q.r.t | 500/888 |
| e.f.g.h | RSVP | 1 | p.q.r.t | 500/777 |
| ⋮ | ⋮ | ⋮ | ⋮ | ⋮ |

| SOURCE | DESTINATION GROUP ADDRESS | PROTOCOL ID | OUTPUT INTERFACE | VPI/VCI |
|---|---|---|---|---|
| H1 | 225. 0. 0. 100 | TCP | 1 | 50/100 |
| H1 | 225. 0. 0. 100 | RSVP | 1 | 50/200 |
| H2 | 230. 10. 10. 0 | UDP | 1 | 100/10 |
| H2 | 230. 10. 10. 0 | RSVP | 1 | 100/11 |
| ⋮ | ⋮ | ⋮ | ⋮ | ⋮ |

N: VIRTUAL CONNECTION ORIENTED NETWORK

| SOURCE | DESTINATION GROUP ADDRESS | PROTOCOL ID | OUTPUT INTERFACE | VPI/VCI |
|---|---|---|---|---|
| H1 | 225. 0. 0. 100 | TCP | 1 | 50/100 |
| H1 | 225. 0. 0. 100 | RSVP | 1 | 25/888 |
| H2 | 230. 10. 10. 0 | UDP | 1 | 100/10 |
| H2 | 230. 10. 10. 0 | RSVP | 1 | 100/11 |
| ⋮ | ⋮ | ⋮ | ⋮ | ⋮ |

N: VIRTUAL CONNECTION ORIENTED NETWORK

| SOURCE | DESTINATION GROUP ADDRESS | PROTOCOL ID | OUTPUT INTERFACE | VPI/VCI |
|---|---|---|---|---|
| H1 | 225.0.0.100 | TCP | 1 | 50/100 |
| H1 | 225.0.0.100 | RSVP | 1 | 50/333 |
| H2 | 230.10.10.0 | UDP | 1 | 100/10 |
| H2 | 230.10.10.0 | RSVP | 1 | 50/333 |
|  | 240.0.0.1 | — | 1 | 50/333 |
| ⋮ | ⋮ | ⋮ | ⋮ | ⋮ |

| SOURCE | DESTINATION GROUP ADDRESS | PROTOCOL ID | OUTPUT INTERFACE | VPI/VCI |
|---|---|---|---|---|
| H1 | 225. 0. 0. 100 | TCP | 1 | 50/100 |
| H1 | 225. 0. 0. 100 | RSVP | 1 | 25/888 |
| H2 | 230. 10. 10. 0 | UDP | 1 | 100/10 |
| H2 | 230. 10. 10. 0 | RSVP | 1 | 25/888 |
|  | 224. 0. 0. 1 | — | 1 | 25/888 |
| ⋮ | ⋮ | ⋮ | ⋮ | ⋮ |

PACKET TRANSMISSION NODE DEVICE REALIZING PACKET TRANSFER SCHEME AND CONTROL INFORMATION TRANSFER SCHEME USING MULTIPLE VIRTUAL CONNECTIONS

BACKGROUND OF THE INVENTION

1. Field of the Invention

The present invention relates to a packet transmission node device which functions as a router or a host for transmitting and receiving packets by being connected to a virtual connection oriented network, and a packet transfer scheme and a control information transfer scheme used in a packet transmission node device.

2. Description of the Background Art

A virtual connection oriented network is a network based on techniques such as ATM (Asynchronous Transfer Mode), frame relay, fiber channel, HIPPI (High Performance Parallel Interface), etc.

On such a network, it is possible to realize a multicast in which a packet sent by a sender to a destination address for multicast (a multicast address) in a network layer is distributed to a plurality of receivers by the network. In the following, for the sake of simplicity, a case of an IP (Internet Protocol) multicast communication on an ATM network which uses IP as the network layer will be described.

FIG. 1 shows a conventional scheme for transferring a packet destined to a multicast address G in an IP multicast communication system. In FIG. 1, H0 to H9 are hosts, where H0 is a sender, and H1, H2, H4, H5, H6, H7 and H8 are receivers. R is a router for transferring a packet, which is connected with the hosts H0 to H9 through ATM connections.

When the network layer is IP, each node (host or router) belongs to a logical group called IP subnet. The communication within the same IP subnet is realized by the direct transfer without passing through a router, while the communication between different IP subnets is realized by utilizing a packet transfer at a router. In FIG. 1, H0, H8 and R belong to an IP subnet A, H1, H2, H3 and R belong to an IP subnet B, H4, H5, H6, H7 and R belong to an IP subnet C, and H9 and R belong to an IP subnet D.

The direct transfer within the same IP subnet can be realized by using either a point-to-multipoint ATM connection or a multicast server (MCS) for carrying out a transfer by duplicating a packet.

In such an IP multicast communication system, a conventional procedure for transferring a packet sent to the multicast address G from a host H0 is as follows.

First, the host H0 transfers a packet destined to G to the host H8 and the router R by using a point-to-multipoint ATM connection. The host H8 then receives this packet and processes the received packet suitably, while the router R transfers this packet to the other subnets (subnets B and C) which have hosts participating in this multicast address G.

In the subnet B, the packet is transferred from the router R to the multicast server MCS by using a point-to-point ATM connection, and the multicast server MCS transfers this packet to the hosts H1 and H2 by using a point-to-multipoint ATM connection. On the other hand, in the subnet C, the packet is transferred from the router R to the hosts H4, H5, H6 and H7 by using a point-to-multipoint ATM connection. The subnet D has no host which is participating in this multicast address G, so that the packet is not transferred to the subnet D.

In this manner, a conventional multicast communication scheme uses one point-to-multipoint connection or one point-to-point connection to a multicast server in transferring the packet between nodes, so that only one and the same quality of service can be provided with respect to one multicast address, and it has been impossible to realize a multicast in which different qualities of service can be provided with respect to different receivers participating in one and the same multicast address.

Now, at a time of transferring a packet to a next hop node from a packet transmission node such as a router or a host connected to the virtual connection oriented network, a virtual connection to that next hop node is set up according to a prescribed connection set up protocol, and a packet transfer is carried out by using a set up virtual connection.

The packets exchanged between transmitting and receiving terminal nodes include actual data between terminal applications as well as various types of control messages, such as a message for a resource reservation for the purpose of requesting a desired communication quality.

In a currently available router connected to the virtual connection oriented network, the identical transfer processing is applied to all the packets which have the identical destination node address, regardless of whether each packet is carrying the user data or the control message. Namely, in a case of the transfer to the virtual connection oriented network, a routing table is referred according to the destination node address of each packet, and then each packet is transmitted to the identical virtual connection according to the routing table, regardless of whether each packet is carrying the user data or the control message.

However, when the control information and the actual communication information are transferred through the same virtual connection, the following problems arise.

(1) In a case of adopting the expansion of the router architecture as described in the Internet Draft "draft-katsube-router-atm-overview-00.txt" (which realizes a faster transfer processing by directly connecting an input virtual connection and an output virtual connection inside a router, without carrying out a network layer processing), it becomes impossible to recognize the control message at a router.

In this case, there is a need to provide a mechanism for extracting only those frames (or cells) received from one virtual connection which correspond to the control message packets, and carrying out an appropriate processing to the extracted control message packets, so as to be able to transfer the other user data frames (or cells) without carrying out the packet level processing. However, an incorporation of such a mechanism causes an increase of a cost for the packet transmission node.

(2) When a problem occurs in the virtual connection which is transferring the user data, the transfer of both the user data and the control message will be stopped, so that there is a possibility for a case in which a handling such as a substitute route selection required at a time of the problem in the virtual connection cannot be carried out properly.

(3) It is impossible to control a plurality of related virtual connections by using a single virtual connection.

SUMMARY OF THE INVENTION

It is therefore an object of the present invention to provide a packet transmission node device and a packet transfer scheme capable of realizing a multicast in which different qualities of service can be provided with respect to different receivers participating in one and the same multicast address.

It is another object of the present invention to provide a packet transmission node device and a control information transfer scheme in which it becomes possible to recognize the control message at a router even when an expanded router architecture is used.

It is another object of the present invention to provide a packet transmission node device and a control information transfer scheme in which a handling such as a substitute route selection required at a time of a problem in the virtual connection can be carried out properly.

It is another object of the present invention to provide a packet transmission node device and a control information transfer scheme in which it is possible to control a plurality of related virtual connections by using a single virtual connection.

According to one aspect of the present invention, there is provided a packet transmission node device, comprising: a routing table for storing output virtual connection identifiers in correspondence to destination addresses, including identifiers of a plurality of virtual connections for different qualities of service in correspondence to a multicast destination address; and transfer means for transferring a packet to output virtual connections determined by referring to the routing table according to a destination address of said packet.

According to another aspect of the present invention, there is provided a method of packet transmission from a packet transmission node, comprising the steps of: setting up a plurality of virtual connections for different qualities of service in correspondence to a multicast destination address; storing output virtual connection identifiers in correspondence to destination addresses, including identifiers of said plurality of virtual connections for different qualities of service set up in correspondence to the multicast destination address, in a routing table of the packet transmission node; and transferring a packet from the packet transmission node to output virtual connections determined by referring to the routing table according to a destination address of said packet.

According to another aspect of the present invention there is provided a packet transmission node device, comprising: a routing table for storing output virtual connection identifiers in correspondence to destination addresses and upper layer protocol identifiers, including identifiers of different output virtual connections for a user data packet and a control packet having an identical destination address; and transfer means for transferring a packet to an output virtual connection determined by referring to the routing table according to a destination address and an upper layer protocol identifier of said packet.

According to another aspect of the present invention there is provided a method of packet transmission from a packet transmission node, comprising the steps of: setting up different output virtual connections for a user data packet and a control packet having an identical destination address; storing output virtual connection identifiers in correspondence to destination addresses and upper layer protocol identifiers, including identifiers of said different output virtual connections set up for a user data packet and a control packet having an identical destination address, in a routing table of the packet transmission node; and transferring a packet to an output virtual connection determined by referring to the routing table according to a destination address and an upper layer protocol identifier of said packet.

Other features and advantages of the present invention will become apparent from the following description taken in conjunction with the accompanying drawings.

BRIEF DESCRIPTION OF THE DRAWINGS

FIG. 3 is a block diagram of a basic configuration of a packet transmission node device according to the present invention.

FIG. 4 is a diagram showing an exemplary content of a routing table in the packet transmission node device of FIG. 3 according to the first embodiment of the present invention.

Figure 16:
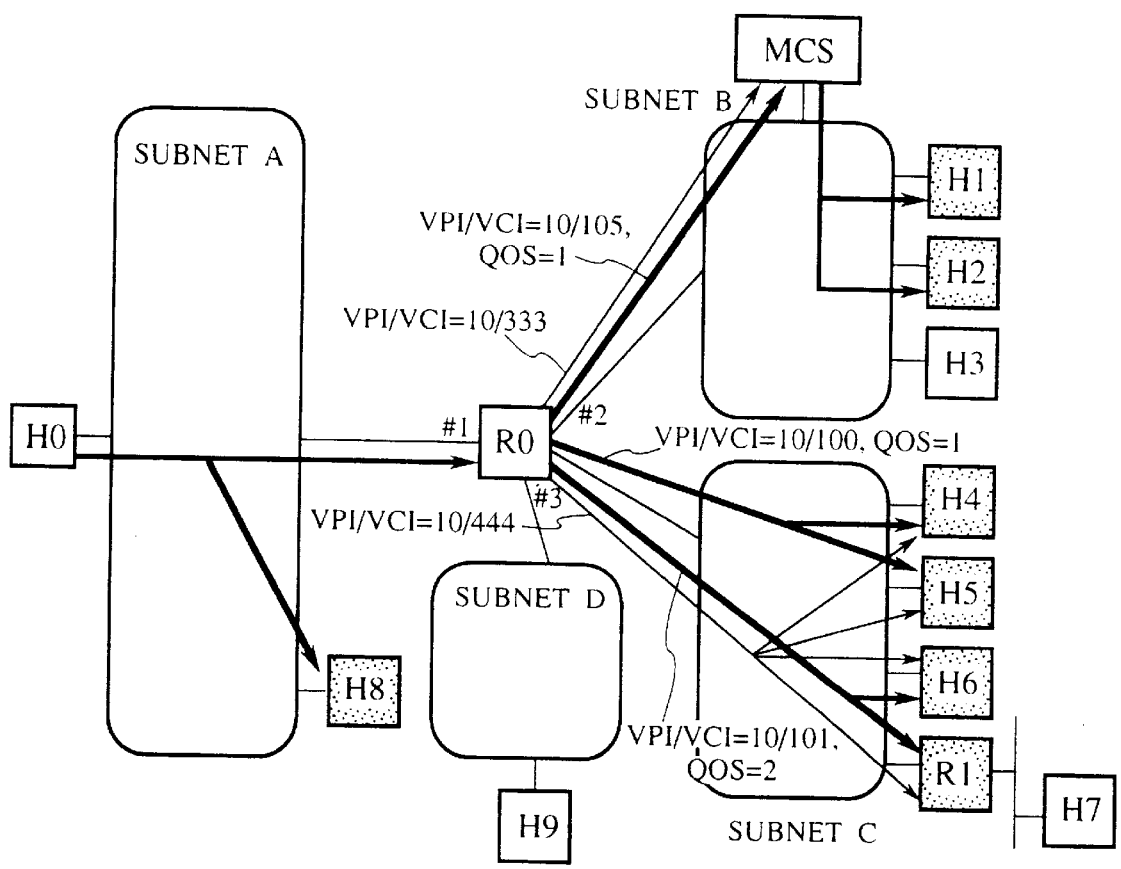
FIG. 16 is a schematic diagram of an IP communication system showing an exemplary overview of packet flow in a case where the packet transfer scheme and the control information transfer scheme according to the present invention are combined together.

3 corresponding to the virtual connection setting of FIG. 16 for a case of combining the packet transfer scheme and the control information transfer scheme according to the present invention.

DETAILED DESCRIPTION OF THE PREFERRED EMBODIMENTS

Referring now to FIG. 2 to FIG. 5, the first embodiment of a packet transmission node device for realizing a packet transfer scheme according to the present invention will be described in detail.

In short, in this first embodiment, a node device connected with at least one virtual connection oriented network has a memory means for storing information including a source address, a destination address, an output interface, an output virtual connection identifier, and a quality of service. This node device also has a transfer means for transferring a packet by referring to the memory means according to a destination address or a pair of a source address and a destination address of a transmitting packet, determining an output interface and an output virtual connection, and controlling a packet transmission means of the determined output interface to transmit the packet through the determined output virtual connection.

The memory means stores a plurality of output virtual connection identifiers in correspondence to a plurality of qualities of service with respect to a destination group address or a pair of a source address and a destination group address, so that a plurality of point-to-multipoint connections are used with respect to one group address. Consequently, it becomes possible to provide different qualities of service with respect to different output virtual connections, i.e., with respect to different receivers participating in this group address.

In addition, the above described mechanism of the node device of this first embodiment can be used along with the conventional multicast delivery mechanism, such that the conventional mechanism can be utilized when all the hosts participating in the same multicast address are requesting the identical quality of service, while the mechanism of this first embodiment can be utilized when there are hosts which request different qualities of service.

Now, the multicast packet transfer scheme at the node device (a host or a router) in this first embodiment will be described in further detail. In the following, the overview of the packet flow in this multicast packet transfer scheme will be described first, and then the node device configuration and the packet transmission procedure in this first embodiment will be described.

Figure 1:
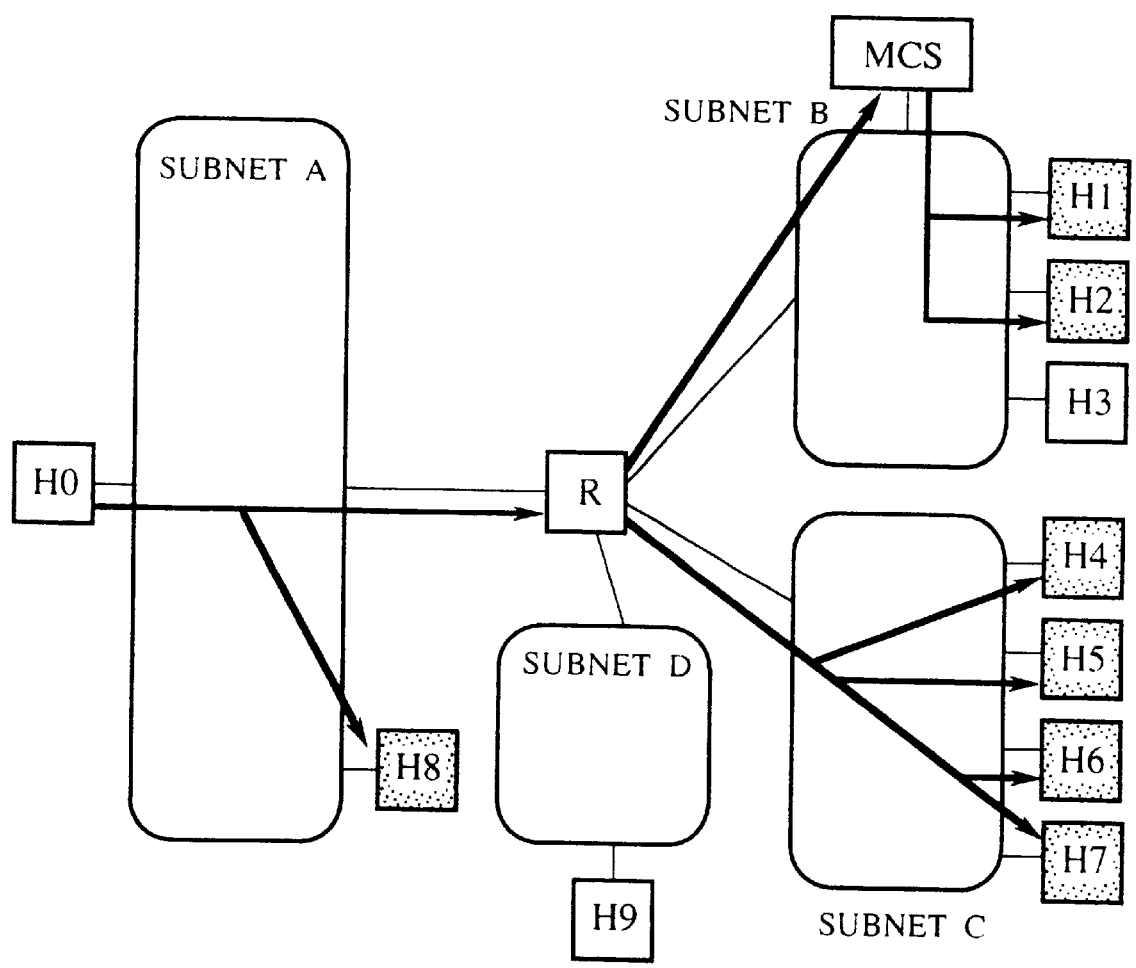
FIG. 1 is a schematic diagram of an IP communication system showing an exemplary overview of packet flow in a conventional IP multicast communication scheme.
Figure 2:
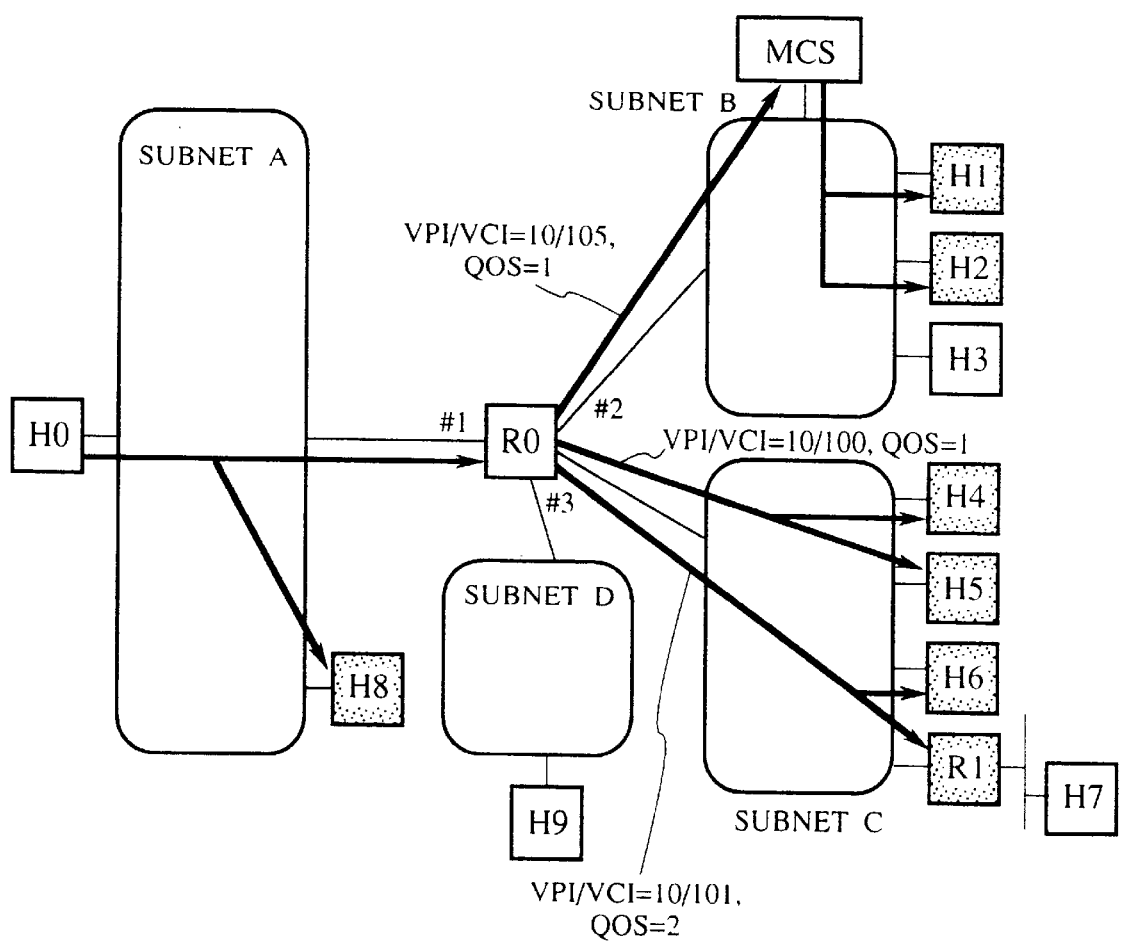
FIG. 2 is a schematic diagram of an IP communication system showing an exemplary overview of packet flow in a packet transfer scheme according to the first embodiment of the present invention.

FIG. 2 shows an exemplary overview of the packet flow in this multicast packet transfer scheme. In FIG. 2, H0 to H9 are hosts, where H0 is a sender, R0 and R1 are routers for transferring packets, and H1, H2, H4, H5, H6, H7 and H8 are receivers which correspond to the group address G. The router R0 is connected with the hosts H0 to H9 except for H7 and the router R1 through ATM connections, and #1, #2 and #3 depicted around the router R0 indicate output interface numbers of this router R0.

When the network layer is IP, each node (host or router) belongs to a logical group called IP subnet. The communication within the same IP subnet is realized by the direct transfer without passing through a router, while the communication between different IP subnets is realized by utilizing a packet forwarding at a router. In FIG. 2, H0, H8 and R0 belong to an IP subnet A, H1, H2, H3 and R0 belong to an IP subnet B, R0, H4, H5, H6 and R1 belong to an IP subnet C, and H9 and R0 belong to an IP subnet D. The IP subnet B has a multicast server (MCS) for carrying out a transfer by duplicating a packet.

In FIG. 2, a procedure for transferring a packet sent to the multicast address G from a host H0 is as follows.

First, the host H0 transfers a packet destined to G to the host H8 and the router R0 by using a point-to-multipoint ATM connection. The host H8 then receives this packet and processes the received packet suitably, while the router R0 transfers this packet to the other subnets (subnets B and C) which have hosts participating in this multicast group G.

In the subnet B, the packet is transferred from the router R0 to the multicast server MCS though the output interface #2 by using a point-to-point ATM connection with the identifier VPI/VCI=10/105 at the output interface corresponding to QOS=1, and the multicast server MCS transfers this packet to the hosts H1 and H2 by using a point-to-multipoint ATM connection.

On the other hand, in the subnet C, the packet is transferred from the router R0 to the hosts H4 to H6 and the router R1 through the output interface #3 by using two point-to-multipoint ATM connections with the identifiers VPI/VCI=10/100 and VPI/VCI=10/101 at the output interface corresponding to QOS=1 and QOS=2, respectively, as indicated in FIG. 2.

The subnet D has no host which is participating in this multicast group G, so that the packet is not transferred to the subnet D.

In order to transfer the packet of the identical destination to two ATM connections by duplicating the packet at the router in the above described manner, the router R0 carries out the following packet transmission procedure. Note that FIG. 2 shows an exemplary case in which this packet transfer is carried out by the router R0, but the similar packet transfer can also be carried out by a host for transmitting a packet, so that the packet transmission procedure will be described below for a node in general, which can be either a router or a host.

First, FIG. 3 shows a node device configuration in this first embodiment, where solid lines indicate the packet flow, while a dashed line indicates the control information flow related to a table referring. In this configuration of FIG. 3, a node device 100 comprises a packet reception unit 101, a packet analysis and transfer unit 102 connected with the packet reception unit 100, a packet transmission unit 103 connected with the packet analysis and transfer unit 102, upper layers 104 connected with the packet analysis and transfer unit 102, and a routing table 105 which is referred to by the packet analysis and transfer unit 102.

The packet reception unit 101 is connected with a LAN (Local Area Network) such as ATM, and functions to assemble a network layer packet from datalink layer frames received from the LAN according to a protocol of the LAN. Here, the datalink layer frames are given by ATM cells, and the network layer packet is given by an IP packet.

The packet analysis and transfer unit 102 judges whether a packet received at the packet reception unit 101 is a packet destined to this node 100 or not. When the received packet is destined to this node 100, this packet will be given to the upper layers 104, whereas when the received packet is not destined to this node 100, the packet analysis and transfer unit 102 carries out the network layer processing, refers to the packet header, and determines an output interface and a next hop node or an output connection identifier according to the routing table 105. In a case of ATM, the output connection is a VC (Virtual Channel) and the output connection identifier is VPI/VCI. The packet analysis and transfer unit 102 also handles a packet given from the upper layers 104 similarly by carrying out the network layer processing, and determining an output interface and a next hop node or an output connection identifier according to the routing table 105.

The packet transmission unit 103 converts the packet given from the packet analysis and transfer unit 102 into the datalink layer frames of the connected LAN, and transmits the converted datalink layer frames to the LAN according to the next hop node or the output connection identifier given by the packet analysis and transfer unit 102.

The upper layers 104 are protocols above the network layer such as TCP (Transmission Control Protocol), or UDP (User Datagram Protocol). More specifically, the upper layers 104 can be a routing protocol for exchanging routing information, an application software, an RSVP (Resource Reservation Protocol) message, etc.

The routing table 105 is a table to be referred by the packet analysis and transfer unit 102. This routing table 105 is set up either statically in advance, or dynamically by the routing protocol.

For an exemplary case shown in FIG. 2, this routing table 105 has a content as shown in FIG. 4. In this routing table of FIG. 4, the output VPI/VCI and the quality of service (QOS) can be searched out by using the source address and the destination address of the packet to be transferred as a search key. It is also possible to use the destination address alone as a search key, without using the transmission source.

When the packet is assigned with an importance level according to a scheme such as a hierarchical coding to be described below such that which packet is to be transmitted is determined according to this importance level, the multicast packet is transferred or transmitted by referring to the quality of service in the routing table, but when the packet is not assigned with an importance level or when all the packets are to be transmitted, there is no need to refer to the quality of service in the routing table at a time of actually transferring or transmitting the multicast packet.

In this first embodiment, there is a possibility for transmitting one packet to a plurality of interfaces and a plurality of output virtual connections, so that it is necessary for the routing table 105 to have a plurality of output I/Fs and a plurality of output VPI/VCIs with respect to a single destination address or a single pair of the source address and the destination address. For this reason, the routing table shown in FIG. 4 is formed by a linked list in which a plurality of output routes are linked by pointers.

In FIG. 4, the routing table has such a setting that, when the source H0 receives a packet with the destination address G, this packet will be transferred to an ATM connection (A) with the output I/F=#3, the output VPI/VCI=10/100, and QOS=1; an ATM connection (B) with the output I/F=#3, the output VPI/VCI=10/101, and QOS=2; and an ATM connection (C) with the output I/F=#2, the output VPI/VCI=10/105, and QOS=1.

Here, for the node group of H1, H2, H4, H5, H6, and R1 corresponding to the multicast group G, the ATM connection (A) is a point-to-multipoint connection terminated at the hosts H4 and H5, the ATM connection (B) is a point-to-multipoint connection terminated at the host H6 and the router R1, and the ATM connection (C) is a point-to-point connection to the multicast server MCS, which is connected with the point-to-multipoint connection from the multicast server MCS to the hosts H1 and H2.

Note that it is possible to make various modifications to this setting, such as a modification to change the above described ATM connection (A) into a point-to-point connection to a multicast server for making connection with the point-to-multipoint connection to the hosts H4 and H5, for example.

When the receivers (H4, H5, H6, and R1, for example) request the respective qualities of service (a bandwidth requested by H4 and H5 is larger than a bandwidth requested by H6 and R1, for example), the setting of the ATM connections and the routing table is made by setting up the ATM connections (a VC of QOS=1 terminated at H4 and H5, and a VC of QOS=2 terminated at H6 and R1) to satisfy the requested qualities of service, and registering information on these connections in the routing table 105.

Figure 5:
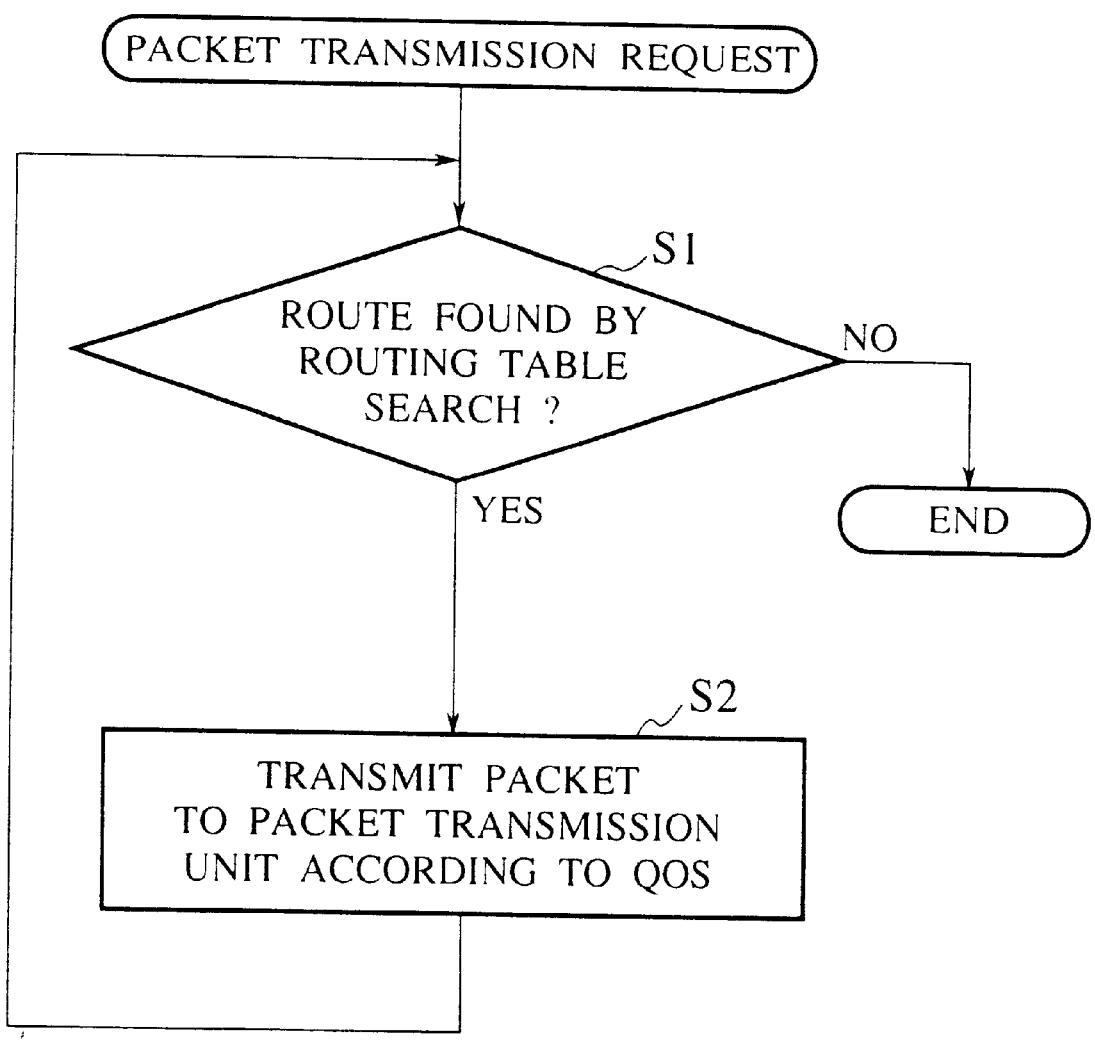
FIG. 5 is a flow chart for a packet transmission procedure according to the first embodiment of the present invention.

The packet transmission procedure in this first embodiment is carried out according to the flow chart of FIG. 5 as follows. This procedure is to be carried out when a router receives the multicast packet at the packet reception unit 101 and transfers this packet to the next hop node, or when a host transmits a packet from the upper layers 104.

The packet given to the packet analysis and transfer unit 102 is analyzed, and the routing table 105 is searched by using the source and the destination address of that packet (step S1). Here, it is also possible to carry out the search by using the destination address alone. As long as the output route is registered in the routing table 105, the registered output route is referred and the packet is transmitted to the registered output I/F and output VPI/VCI according to the quality of service specified for each connection (step S2). Here, the packet transmission according to the quality of service implies the packet transmission while dropping packets according to the quality of service. For example, an importance level assigned to each packet can be registered within each packet according to the hierarchical coding scheme, such that the packets to be transmitted can be selected according to this importance level and the quality of service specified for each connection.

This processing is repeated as many times as necessary, and when the processing to transmit one packet is completed for all the output connections registered in the routing table 105, this packet transmission procedure is terminated. In this manner, it is possible to transfer the packet of the identical destination to a plurality of ATM connections by duplicating the packet.

In an exemplary case shown in FIG. 2, when the packet with the source address H0 and the destination address G is received at the router R0, the routing table 105 is searched, and this packet is transferred to the ATM connection (A) with the output I/F=#3, the output VPI/VCI=10/100, and the QOS=1 first. Then, by searching the routing table 105 further, this packet is also transferred to the ATM connection (B) with the output I/F=#3, the output VPI/VCI=10/101, and the QOS=2. Finally, by searching the routing table 105 further, this packet is also transferred to the ATM connection (C) with the output I/F=#2, the output VPI/VCI=10/105, and the QOS=1, so as to complete the packet transfer.

As described, according to this first embodiment, a plurality of output virtual connections including point-to-multipoint connections are made available with respect to one multicast address, so that it becomes possible to provide different qualities of service with respect to different output virtual connections, i.e., with respect to different receivers participating in this multicast group.

Referring now to FIG. 6 to FIG. 15, the second to sixth embodiments of a packet transmission node device for realizing a control information transfer scheme according to the present invention will be described in detail.

In the following, it is to be understood that a virtual connection oriented network is a network based on techniques such as ATM (Asynchronous Transfer Mode), frame relay, fiber channel, HIPPI (High Performance Parallel Interface), etc.

It is also to be understood that a packet transmission node is either a packet switching device such as a router or a packet transmission/reception terminal.

It is also to be understood that a node address is given by an IP address, a MAC address, an address of IPX, an address of AppleTalk, etc.

It is also to be understood that a control packet is a packet used for a resource reservation protocol such as STII (Stream Protocol II) and RSVP (Resource Reservation Protocol), which is to be exchanged between transmission and reception terminals through a packet transmission node, for example.

In short, in the control information transfer scheme according to the present invention, when a packet transmission node transmits a packet to a next hop node by using a virtual connection, the virtual connection to which the packet is to be transmitted is determined by referring the routing table according to both a destination node address field and a protocol identifier in the packet header at the packet analysis and transfer unit. Namely, the routing table is formed such that an output interface and an output virtual connection can be obtained by using both the destination address field and the protocol identifier as a search key. Here, it is also possible to use a source address as a search key in addition.

In one aspect of the control information transfer scheme according to the present invention, two types of virtual connections for control packets and for user data packets are separately provided, even for those control packets and user data packets which have the same destination node address (unicast or multicast) and which are to be transferred (transmitted) to the same next hop node (the same next hop node group in a case of multicast). Then the control packets and the user packets are transferred (transmitted) by using the respective virtual connections according to the setting in the routing table.

In another aspect of the control information transfer scheme according to the present invention, among those packets which have the same destination group address, the user data packets are transferred (transmitted) by using a virtual connection for transferring (transmitting) to a next hop node group which should receive/transfer the packets having the above noted group address. On the other hand, for the control packets, a virtual connection for transferring (transmitting) the control packets altogether to a packet transmission node group including a next hop node group which should receive/transfer the packets having the above noted group address as well as a next hop node group which should receive/transfer the packets having other group address different from the above noted group address. Then, the control packets are transferred (transmitted) altogether by using that virtual connection.

Now, with references to FIG. 6 and FIG. 7, the second embodiment of a packet transmission node device for realizing a control information transfer scheme according to the present invention will be described in detail.

In this second embodiment, the configuration of the packet transmission node device is basically the same as that of FIG. 3 in the first embodiment described above.

In a case where the packet transmission node device 100 is a router, when a packet is received from the packet reception unit 101, a network layer packet (an IP datagram in a case of IP) is assembled from the datalink layer frames (cells in a case of ATM), and given to the packet analysis and transfer unit 102.

At the packet analysis and transfer unit 102, an output interface and an output virtual connection for transmitting this packet are determined by searching the routing table 105 according to the header information of the received packet, and this packet is sent to the packet transmission unit 103 corresponding to the determined output interface.

At the packet transmission unit 103, this packet is converted into the datalink layer frames (cells in a case of ATM), and the converted datalink layer frames are transmitted to the output virtual connection determined by the packet analysis and transfer unit 102.

Now, with references to FIG. 6 and FIG. 7, the control information transfer scheme in this second embodiment will be described for an exemplary case in which the packet transmission node device is a router.

Figures 6, 7:
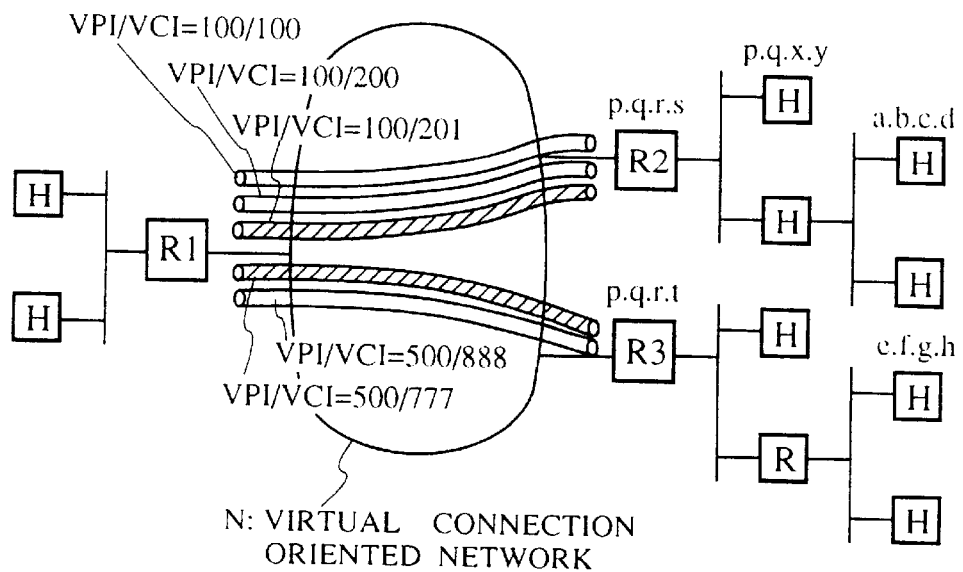
FIG. 6 is a schematic diagram of an IP communication system showing an exemplary virtual connection setting in a control information transfer scheme according to the second embodiment of the present invention.
FIG. 7 is a diagram showing an exemplary content of a routing table in the packet transmission node device of FIG. 3 corresponding to the virtual connection setting of FIG. 6 according to the second embodiment of the present invention.

FIG. 6 shows an exemplary network system configuration in this second embodiment. In FIG. 6, routers R1, R2 and R3 are connected to a virtual connection oriented network N, and the other routers R and hosts H connected with these routers R1, R2 and R3 are connected to connection-less networks such as Ethernets.

In this exemplary configuration, the content of the routing table at the router R1 is as shown in FIG. 7, which is to be referred in a case of transferring packets which have destination addresses "a.b.c.d", "p.q.x.y" and "e.f.g.h" of the hosts.

The search key to be used in searching this routing table of FIG. 7 is the destination IP address and the protocol identifier in the packet header. The protocol identifier indicates whether the upper layer protocol of that packet is TCP or UDP (which also indicates that it is a user data packet), or if it is a control message for RSVP, etc. (which also indicates that it is a control packet). As a result of searching this routing table, the information such as the output interface indicating an interface port to which the packet should be outputted, the next hop node address indicating an IP address of the next hop node, and the identifier of the virtual connection to which the packet should be outputted (an identifier VPI/VCI of a VC (Virtual Channel) of an ATM connection is used in FIG. 7 as an example) can be obtained.

In a case of searching by using the destination IP address alone as a search key as in a case of a conventional routing table, the packets are going to be outputted to the same virtual connection regardless of whether the upper layer protocol is TCP or UDP, or whether it is a control message for RSVP, etc. or not. In contrast, in this second embodiment, as shown in FIG. 7, the packets are outputted to different virtual connections when the upper layer protocols are different even when the destination IP address is the same.

Namely, for the packet with the destination IP address "a.b.c.d", the IP address of the next hop router is "p.q.r.s", and as the virtual connection up to that next hop router, the virtual connection with VPI/VCI=100/200 is provided for data transfer (user data packet transfer), while the virtual connection with VPI/VCI=100/201 is provided for RSVP control message (path message) transfer (control packet transfer).

Also, for the packet with the destination IP address "p.q.x.y", the IP address of the next hop router is "p.q.r.s", and as the virtual connection up to that next hop router, the virtual connection with VPI/VCI=100/100 is provided for data transfer, while the virtual connection with VPI/VCI= 100/201 is also used for RSVP control message transfer. In this manner, the control packets having different destination IP addresses and the same next hop node can be transferred by using the same virtual connection.

Also, for the packet with the destination IP address "e.f.g.h", the IP address of the next hop router is "p.q.r.t", and as the virtual connection up to that next hop router, the virtual connection with VPI/VCI=500/888 is provided for data transfer, while the virtual connection with VPI/VCI= 500/777 is provided for RSVP control message transfer.

Here, the set up of each virtual connection can be realized by the ATM signaling procedure or the management procedure.

Next, with references to FIG. 8 and FIG. 9, the third embodiment of a packet transmission node device for realizing a control information transfer scheme according to the present invention will be described in detail.

In this third embodiment, the configuration of the packet transmission node device is basically the same as that of FIG. 3 in the first embodiment described above.

Figures 8, 9:
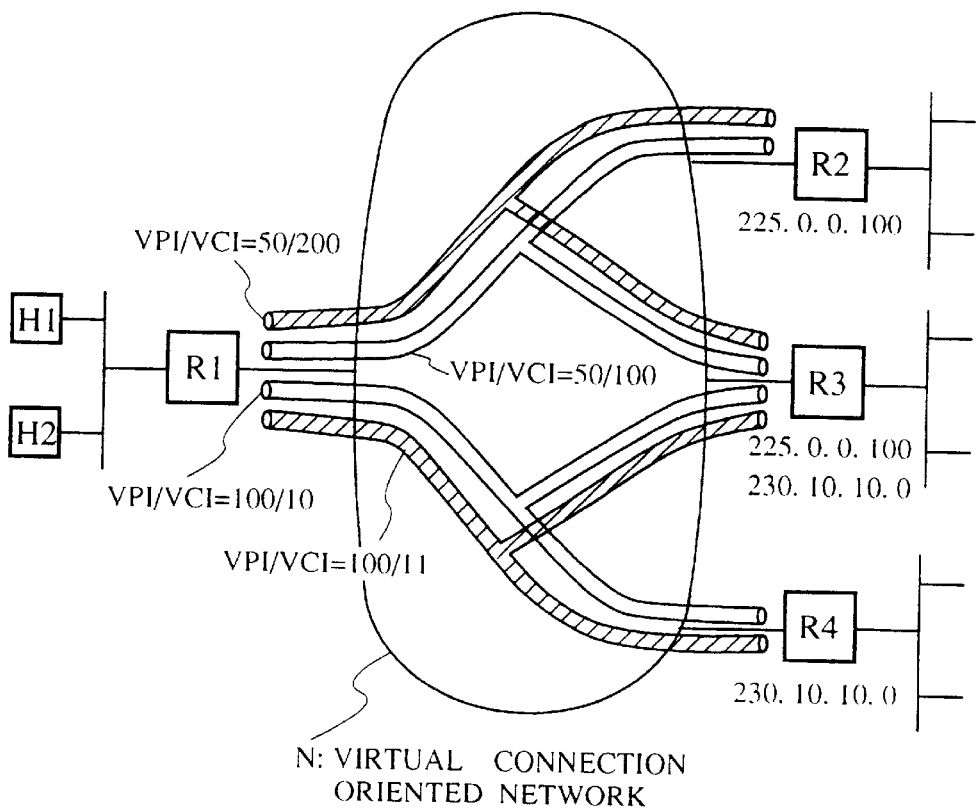
FIG. 8 is a schematic diagram of an IP communication system showing an exemplary virtual connection setting in a control information transfer scheme according to the third embodiment of the present invention.
FIG. 9 is a diagram showing an exemplary content of a routing table in the packet transmission node device of FIG. 3 corresponding to the virtual connection setting of FIG. 8 according to the third embodiment of the present invention.

FIG. 8 shows an exemplary network system configuration in this third embodiment. In FIG. 8, routers R1, R2, R3 and R4 are connected to a virtual connection oriented network N. This third embodiment is directed to a case of the multicast communication using the IP group address.

In this exemplary configuration, the content of the routing table at the router R1 is as shown in FIG. 9, which is to be referred in a case of transferring packets which have the group addresses "225.0.0.100" and "230.10.10.0" as the destination addresses.

The search key to be used in searching this routing table of FIG. 9 is the destination group address (multicast address) and the protocol identifier in the packet header (and possibly the source address). As a result of searching this routing table, the information such as the output interface Indicating an interface port to which the packet should be output, and the identifier of the virtual connection to which the packet should be output (an identifier VPI/VCI of a VC (Virtual Channel) of an ATM connection is used in FIG. 9 as an example) can be obtained.

FIG. 8 shows an exemplary case in which the routers R2 and R3 are participating in the group address "225.0.0.100", while the routers R3 and R4 are participating in the group address "230.10.10.0". In other words, the hosts participating in the group address "225.0.0.100" exist on a downstream side of the routers R2 and R3, while the hosts participating in the group address "230.10.10.0" exist on a downstream side of the routers R3 and R4.

In this third embodiment, as shown in FIG. 9, the packets are output to different virtual connections when the upper layer protocols are different even when the destination group address is the same.

Namely, for the packet with the destination group address "225.0.0.100", the point-to-multipoint virtual connection with VPI/VCI=50/100 connected to R2 and R3 is provided for data transfer, while the point-to-multipoint virtual connection with VPI/VCI=50/200 connected to R2 and R3 is provided for RSVP control message transfer.

Also, for the packet with the destination group address "230.10.10.0", the point-to-multipoint virtual connection with VPI/VCI=100/10 connected to R3 and R4 is provided for data transfer, while the point-to-multipoint virtual connection with VPI/VCI=100/11 connected to R3 and R4 is provided for RSVP control message transfer.

Here, the set up of each virtual connection is going to be realized by the ATM signaling procedure or the management procedure.

Next, with references to FIG. 10 and FIG. 11, the fourth embodiment of a packet transmission node device for realizing a control information transfer scheme according to the present invention will be described in detail.

In this fourth embodiment, the configuration of the packet transmission node device is basically the same as that of FIG. 3 in the first embodiment described above.

Figures 10, 11:
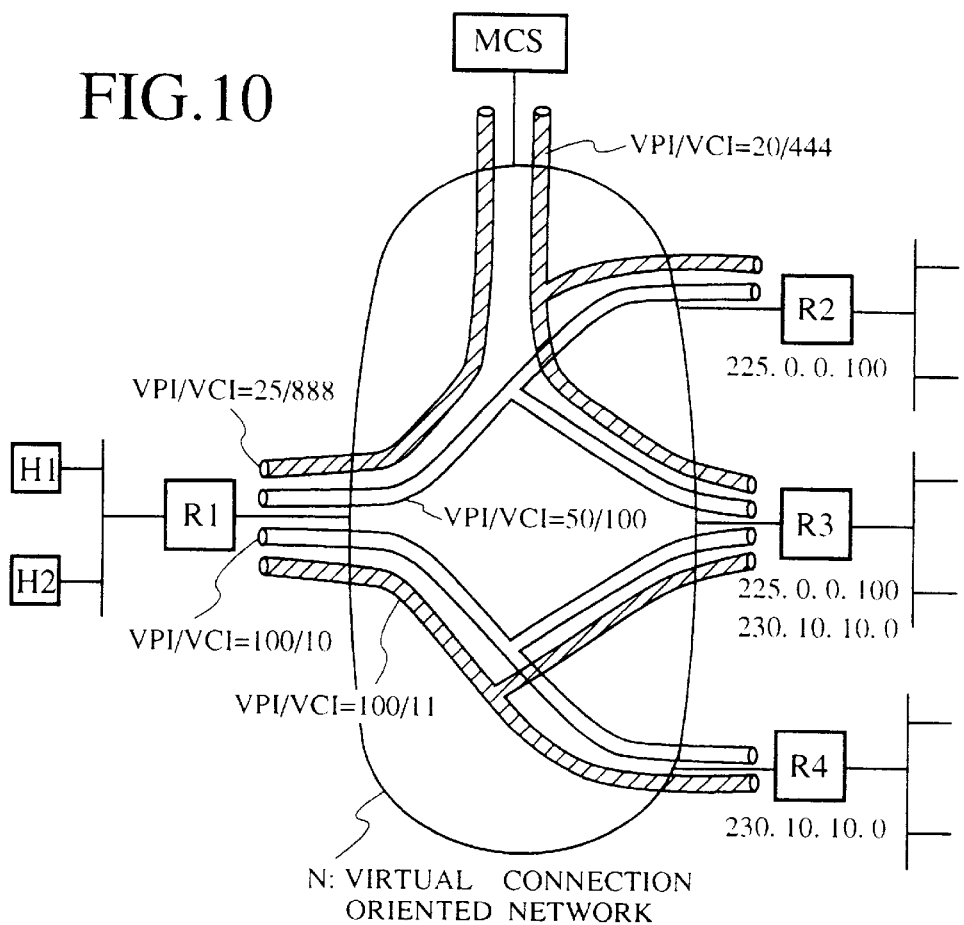
FIG. 10 is a schematic diagram of an IP communication system showing an exemplary virtual connection setting in a control information transfer scheme according to the fourth embodiment of the present invention.
FIG. 11 is a diagram showing an exemplary content of a routing table in the packet transmission node device of FIG. 3 corresponding to the virtual connection setting of FIG. 10 according to the fourth embodiment of the present invention.

FIG. 10 shows an exemplary network system configuration in this fourth embodiment. In FIG. 10, the third embodiment of FIG. 8 is modified by incorporating a multicast server (MCS) in order to provide the multicast communications of a plurality of senders efficiently.

In this fourth embodiment, the manner of utilizing virtual connections for data transfer is the same as in the third embodiment described above. On the other hand, as a virtual connection for RSVP control message transfer to the destination group address "225.0.0.100", a virtual connection with VPI/VCI=25/888 connected to the MCS is utilized, and the MCS which received the control message through this virtual connection then transfers the control messages to the routers R2 and R3 on the downstream side by using a point-to-multipoint virtual connection with VPI/VCI=20/ 444 connected to the routers R2 and R3.

In this case, it is not necessary for every transmission node to have a point-to-multipoint virtual connection for control message transfer to the multicast address "225.0.0.100", and it suffices for each transmission node to have a point-to-point virtual connection to the MCS, so that it is possible to expect a reduction of a number of virtual connections compared with a case of having as many point-to-multipoint virtual connections as a number of senders as in the third embodiment described above.

In this exemplary configuration, the content of the routing table at the router R1 is as shown in FIG. 11.

In this fourth embodiment, as shown in FIG. 11, the packets are output to different virtual connections when the upper layer protocols are different even when the destination group address is the same.

Namely, for the packet with the destination group address "225.0.0.100", the point-to-multipoint virtual connection with VPI/VCI=50/100 connected to R2 and R3 is used for data transfer when the upper layer protocol is TCP (user data packet), while the point-to-point virtual connection with VPI/VCI=25/888 connected to the MCS is used for RSVP control message transfer when the upper layer protocol is RSVP (control packet). This virtual connection with VPI/ VCI=25/888 is a point-to-point virtual connection from which packets are forwarded by the MCS to a point-to-multipoint virtual connection with VPI/VCI=20/444 connected to R2 and R3.

Here, the set up of each virtual connection is going to be realized by the ATM signaling procedure or the management procedure.

Note that the MCS can determine the output interface and the output virtual connection according to VPI/VCI of the received cell. In a case of the configuration of FIG. 10, the MCS has such a setting that the point-to-multipoint virtual connection with VPI/VCI=20/444 is determined according to VPI/VCI of the received cell. Here, in order to avoid the interleaving at the cell level in a case where the control messages from a plurality of senders (which are received through different virtual connections) are to be transmitted to the same point-to-multipoint virtual connection, it is preferable to assemble the cell up to the AAL (ATM Adaptation Layer) frame. Alternatively, it is also possible to assemble a packet from the received cell at the MCS, and determine the output VPI/VCI by referring to the destination group address as in a usual router.

Note also that the above described fourth embodiment is directed to an exemplary case in which only the control packets are transferred by using the MCS, but it is also possible to transfer the user data packets by using the MCS as well. In such a case, however, the virtual connection for data transfer and the virtual connection for control message transfer are to be provided separately in accordance with the present invention.

Next, with references to FIG. 12 and FIG. 13, the fifth embodiment of a packet transmission node device for realizing a control information transfer scheme according to the present invention will be described in detail.

In this fifth embodiment, the configuration of the packet transmission node device is basically the same as that of FIG. 3 in the first embodiment described above.

Figures 12, 13:
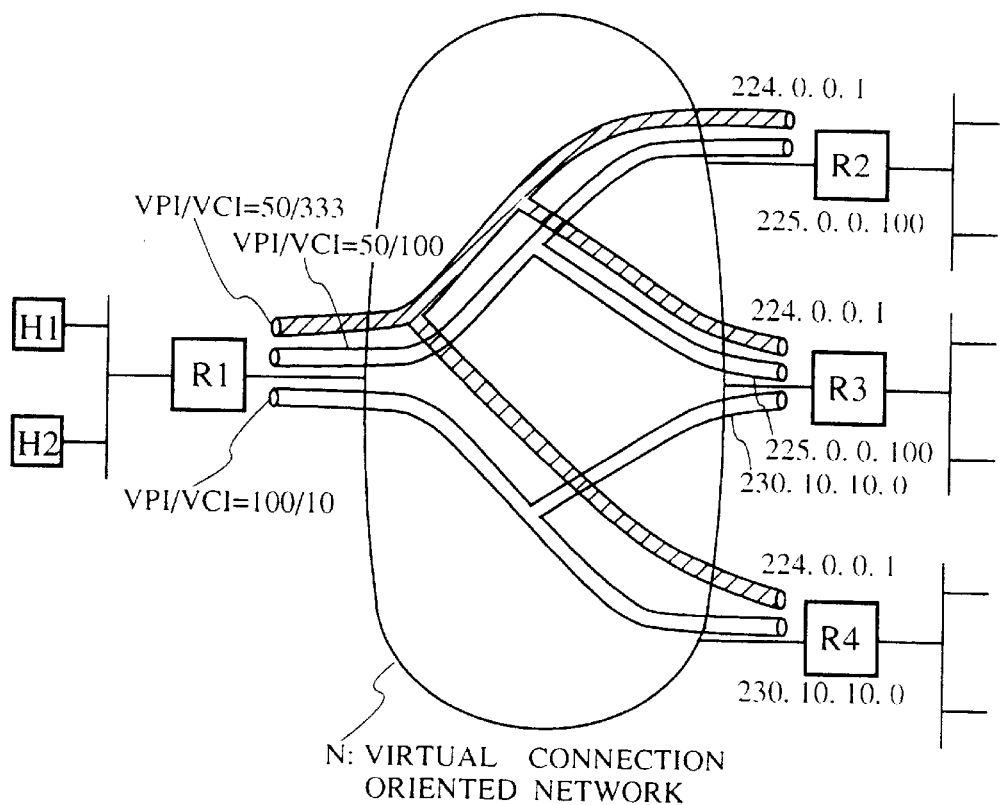
FIG. 12 is a schematic diagram of an IP communication system showing an exemplary virtual connection setting in a control information transfer scheme according to the fifth embodiment of the present invention.
FIG. 13 is a diagram showing an exemplary content of a routing table in the packet transmission node device of FIG. 3 corresponding to the virtual connection setting of FIG. 12 according to the fifth embodiment of the present invention.

FIG. 12 shows an exemplary network system configuration in this fifth embodiment. In this fifth embodiment, the manner of utilizing virtual connections for data transfer is the same as in the third embodiment described above. On the other hand, as a virtual connection for RSVP control message transfer, a virtual connection with VPI/VCI=50/333 connected to all of R2, R3 and R4 is utilized. This virtual connection is provided in correspondence to an IP address "224.0.0.1" which means all local nodes participating in the multicast communication.

In this exemplary configuration, the content of the routing table at the router R1 is as shown in FIG. 13.

The search key to be used in searching this routing table of FIG. 13 is the destination group address (multicast address) and the protocol identifier in the packet header (and possibly the source address).

In this fifth embodiment, as shown in FIG. 13, the packets are output to different virtual connections when the upper layer protocols are different even when the destination group address is the same.

Namely, for the packet with the destination group address "225.0.0.100", the point-to-multipoint virtual connection with VPI/VCI=50/100 connected to R2 and R3 is used for data transfer when the upper layer protocol is TCP (user data packet), while the point-to-multipoint virtual connection with VPI/VCI=50/333 connected to all of R2, R3 and R4 is used for RSVP control message transfer when the upper layer protocol is RSVP (control packet).

Also, for the packet with the destination group address "230.10.10.0", the point-to-multipoint virtual connection with VPI/VCI=100/10 connected to R3 and R4 is used for data transfer, while the point-to-multipoint virtual connection with VPI/VCI=50/333 is also used for RSVP control message transfer.

In addition, the packets with the destination group address "224.0.0.1" are also transferred by the point-to-multipoint virtual connection with VPI/VCI=50/333. This IP address "224.0.0.1" is used for the packet communication in which the upper layer protocol is IGMP (Internet Group Management Protocol) for example.

The virtual connection with VPI/VCI=50/333 is a point-to-multipoint virtual connection destined to R2, R3 and R4 which is set up with respect to the IP address "224.0.0.1".

Here, the set up of each virtual connection is going to be realized by the ATM signaling procedure or the management procedure.

In this fifth embodiment, all the multicast participating nodes are members of the address "224.0.0.1" so that when the control messages are transmitted to the point-to-multipoint virtual connection destined to this address "224.0.0.1", each downstream side node is going to receive the messages not relevant to that node, but it suffices to discard such messages not relevant to each node at the receiving side.

Note that the above described fifth embodiment is directed to an exemplary case in which the control packets are transmitted to the virtual connection which is set up to be destined to all the local nodes participating in the multicast communication, but using the configuration similar to that of FIG. 12, it is also possible to specify some multicast groups among a plurality of existing multicast groups, and transmit the control packets to a point-to-multipoint virtual connection which is set up to be destined to the local nodes participating in any of the specified multicast groups (nodes for which the hosts participating in the specified multicast group exist on their downstream sides).

Next, with references to FIG. 14 and FIG. 15, the sixth embodiment of a packet transmission node device for realizing a control information transfer scheme according to the present invention will be described in detail.

In this sixth embodiment, the configuration of the packet transmission node device is basically the same as that of FIG. 3 in the first embodiment described above.

Figures 14, 15:
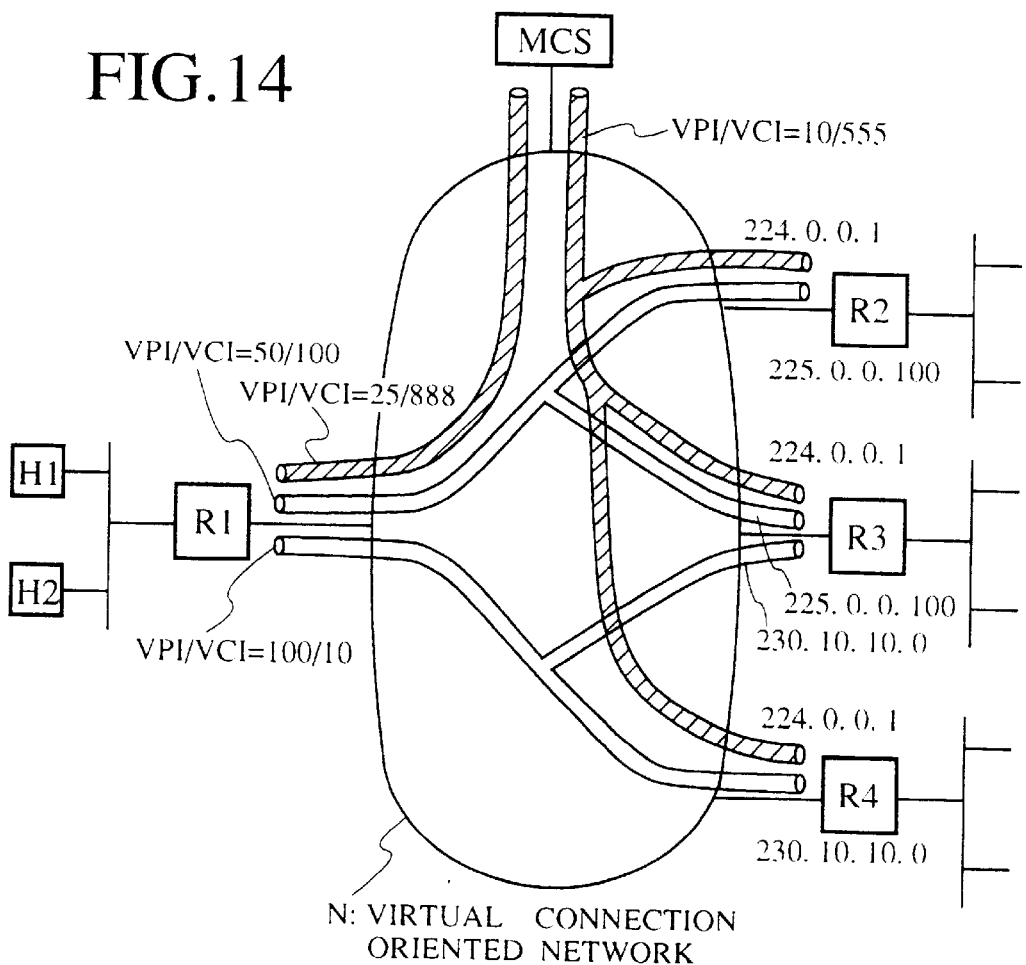
FIG. 14 is a schematic diagram of an IP communication system showing an exemplary virtual connection setting in a control information transfer scheme according to the sixth embodiment of the present invention.
FIG. 15 is a diagram showing an exemplary content of a routing table in the packet transmission node device of FIG. 3 corresponding to the virtual connection setting of FIG. 14 according to the sixth embodiment of the present invention.

FIG. 14 shows an exemplary network system configuration in this sixth embodiment. In FIG. 14, the fifth embodiment of FIG. 12 is modified by incorporating a multicast server (MCS) in order to provide the multicast communications of a plurality of senders efficiently.

In this sixth embodiment, the manner of utilizing virtual connections for data transfer is the same as in the fifth embodiment described above. On the other hand, as a virtual connection for RSVP control message transfer to the destination group address "224.0.0.1" described above, a virtual connection with VPI/VCI=25/888 connected to the MCS is utilized, and the MCS which received the control message through this virtual connection then transfers the control messages to the routers R2, R3 and R4 on the downstream side by using a point-to-multipoint virtual connection with VPI/VCI=10/555 connected to the routers R2, R3 and R4 and destined to the address "224.0.0.1".

In this case, it is not necessary for every transmission node to have a point-to-multipoint virtual connection for control message transfer to the multicast address "224.0.0.1", and it suffices for each transmission node to have a point-to-point virtual connection to the MCS, so that it is possible to expect a reduction of a number of virtual connections compared with a case of having as many point-to-multipoint virtual connections as a number of senders as in the fifth embodiment described above.

In this exemplary configuration, the content of the routing table at the router R1 is as shown in FIG. 15.

In this sixth embodiment, as shown in FIG. 15, the packets are output to different virtual connections when the upper layer protocols are different even when the destination group address is the same.

Namely, for the packet with the destination group address "225.0.0.100", the point-to-multipoint virtual connection with VPI/VCI=50/100 connected to R2 and R3 is used for data transfer when the upper layer protocol is TCP (user data packet), while the point-to-point virtual connection with VPI/VCI=25/888 connected to the MCS is used for RSVP control message transfer when the upper layer protocol is RSVP (control packet).

Also, for the packet with the destination group address "230.10.10.0", the point-to-multipoint virtual connection with VPI/VCI=100/10 connected to R3 and R4 is used for data transfer, while the point-to-point virtual connection with VPI/VCI=25/888 is also used for RSVP control message transfer.

In addition, the packets with the destination group address "224.0.0.1" are also transferred by the point-to-point virtual connection with VPI/VCI=25/888.

The virtual connection with VPI/VCI=25/888 is a point-to-point virtual connection from which packets are forwarded by the MCS to a point-to-multipoint virtual connection with VPI/VCI=10/555 connected to R2, R3 and R4.

Here, the set up of each virtual connection is going to be realized by the ATM signaling procedure or the management procedure.

Note that the MCS can determine the output interface and the output virtual connection according to VPI/VCI of the received cell. In a case of the configuration of FIG. 14, the MCS has such a setting that the point-to-multipoint virtual connection with VPI/VCI=10/555 is determined according to VPI/VCI of the received cell. Here, in order to avoid the interleaving at the cell level in a case where the control messages from a plurality of senders (which are received through different virtual connections) are to be transmitted to the same point-to-multipoint virtual connection, it is preferable to assemble the cell up to the AAL (ATM Adaptation Layer) frame. Alternatively, it is also possible to assemble a packet from the received cell at the MCS, and determine the output VPI/VCI by referring to the destination group address as in a usual router.

Note also that this sixth embodiment is directed to an exemplary case in which only the control packets are transferred by using the MCS, but it is also possible to transfer the user data packets by using the MCS as well. In such a case, however, the virtual connection for data transfer and the virtual connection for control message transfer are to be provided separately in accordance with the present invention.

As described, according to the second to sixth embodiments, it becomes possible to separate the virtual connection to be used for the user data packet transmission and the virtual connection to be used for the control packet transmission, by using the information other than the destination address in determining the output virtual connection for each packet.

Consequently, when this control information transfer scheme is applied to a router within which the input virtual connection and the output virtual connection are directly connected, it becomes possible to recognize and handle the control message at the router by concatenating the input and output virtual connections used for the user data packet transmission, while carrying out the network layer processing for the virtual connection to be used for the control message packet transmission.

Also, even when a problem occurs in the virtual connection which is transferring the user data packets, it is still possible to transfer the control packets.

In addition, it becomes possible to control a plurality of related virtual connections simultaneously, by means of a single virtual connection.

Thus, according to the control information transfer scheme of the present invention, it becomes possible to recognize the control message at a router even when an expanded router architecture is used, a handling such as a substitute route selection required at a time of trouble in the virtual connection can be carried out properly, and it is possible to control a plurality of related virtual connections by using a single virtual connection.

It is to be noted that the packet transfer scheme of the first embodiment described above and the control information transfer scheme of any of the second to sixth embodiment described above can be realized simultaneously by the same packet transmission node device.

For instance, as shown in FIG. 16, the packet transfer scheme of FIG. 2 described above may be modified by incorporating an additional virtual connection with VPI/VCI=10/444 connected to the hosts H4 to H6 and the router R1, which is to be used for control message packet transfer according to the control information transfer scheme of the present invention.

Figure 17:
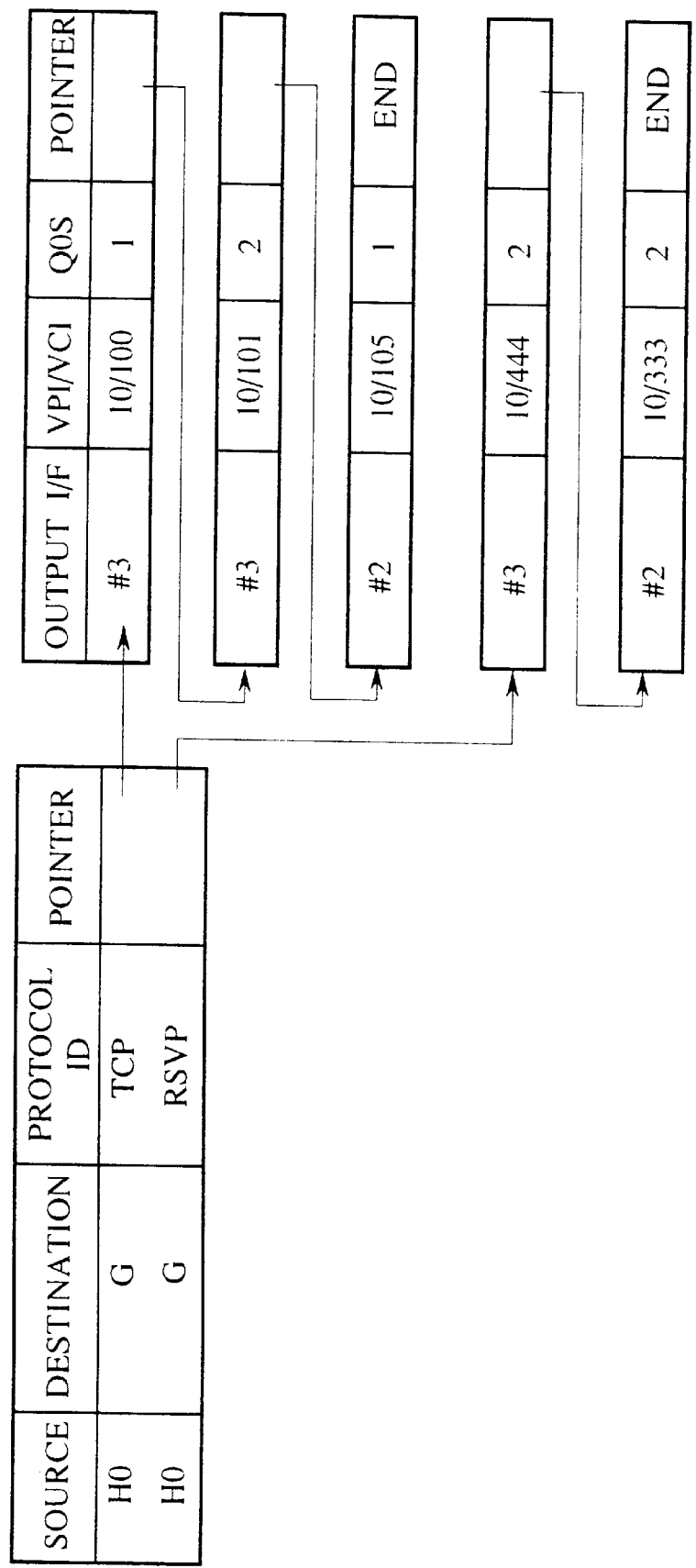
FIG. 17 is a diagram showing an exemplary content of a routing table in the packet transmission node device of FIG.

In this case, the routing table of the packet transmission node device has a content as shown in FIG. 17, which effectively combines a content similar to that of FIG. 4 for user data packet transfer and a content similar to that of FIGS. 7, 9, 11, 13 or 15 for control packet transfer.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet transmission node device, comprising:
   a routing table for storing output virtual connection identifiers in correspondence to destination addresses, including identifiers of a plurality of virtual connections for different qualities of service in correspondence to a multicast destination address; and
   transfer means for transferring a packet to output virtual connections determined by referring to the routing table according to a destination address of said packet.

2. The device of claim 1, wherein the routing table stores each output virtual connection identifier in correspondence to a pair of a source address and a destination address, and the transfer means refers to the routing table according to a source address and a destination address of said packet.

3. The device of claim 1, wherein the routing table also stores an output interface of the device corresponding to each output virtual connection identifier.

4. The device of claim 1, wherein the routing table also stores a quality of service corresponding to each output virtual connection identifier.

5. The device of claim 1, wherein a packet destined to the multicast destination address is to be transmitted to a node group corresponding to a multicast group including a plurality of sub-node groups, and the routing table stores the identifiers of said plurality of virtual connections for different qualities of service which are connected to said plurality of sub-node groups.

6. A method of packet transmission from a packet transmission node, comprising the steps of:
   setting up a plurality of virtual connections for different qualities of service in correspondence to a multicast destination address;
   storing output virtual connection identifiers in correspondence to destination addresses, including identifiers of said plurality of virtual connections for different qualities of service set up in correspondence to the multicast destination address, in a routing table of the packet transmission node; and transferring a packet from the packet transmission node to output virtual connections determined by referring to the routing table according to a destination address of said packet.

7. The method of claim 6, wherein the storing step stores each output virtual connection identifier in correspondence to a pair of a source address and a destination address, and the transferring step refers to the routing table according to a source address and a destination address of said packet.

8. The method of claim 6, wherein the storing step also stores an output interface of the packet transmission node corresponding to each output virtual connection identifier.

9. The method of claim 6, wherein the storing step also stores a quality of service corresponding to each output virtual connection identifier.

10. The method of claim 6, wherein a packet destined to the multicast destination address is to be transmitted to a node group corresponding to a multicast group including a plurality of sub-node groups, and the storing step stores the identifiers of said plurality of virtual connections for different qualities of service which are connected to said plurality of sub-node groups.

11. A packet transmission node device, comprising:
a routing table for storing output virtual connection identifiers in correspondence to destination addresses and upper layer protocol identifiers, including identifiers of different output virtual connections for a user data packet and a control packet having an identical destination address; and
transfer means for transferring a packet to an output virtual connection determined by referring to the routing table according to a destination address and an upper layer protocol identifier of said packet.

12. The device of claim 11, wherein the routing table also stores an output interface of the device corresponding to each output virtual connection identifier.

13. The device of claim 11, wherein the routing table also stores a next hop node address corresponding to each output virtual connection identifier.

14. The device of claim 11, wherein the routing table stores one output virtual connection identifier for control packets destined to an identical next hop node.

15. The device of claim 11, wherein the routing table stores an output virtual connection identifier of a point-to-point virtual connection connected to a multicast server for a control packet destined to a multicast destination address, and the multicast server transmits packets from said point-to-point virtual connection to a point-to-multipoint virtual connection connected to next hop nodes for said control packet.

16. The device of claim 11, wherein the routing table stores an output virtual connection identifier of a point-to-multipoint virtual connection for a plurality of control packets destined to different multicast destination addresses, said point-to-multipoint virtual connection being connected to next hop nodes for said plurality of control packets.

17. The device of claim 11, wherein the routing table stores one output virtual connection identifier for control packets destined to next hop node groups corresponding to a plurality of multicast groups, while storing one output virtual connection identifier for user data packets destined to a next hop node group corresponding to each multicast group.

18. The device of claim 11, wherein the routing table stores the output virtual connection identifiers for user data packets including identifiers of a plurality of virtual connections for different qualities of service in correspondence to a multicast destination address, and the transfer means transfers a user data packet destined to the multicast destination address to output virtual connections determined by referring to the routing table according to a destination address and an upper layer protocol identifier of the user data packet.

19. The device of claim 18, wherein the routing table stores each output virtual connection identifier for user data packets in correspondence to a source address and a destination address, and the transfer means refers to the routing table according to a source address and a destination address of the user data packet.

20. The device of claim 18, wherein the routing table also stores an output interface of the device corresponding to each output virtual connection identifier for user data packets.

21. The device of claim 18, wherein the routing table also stores a quality of service corresponding to each output virtual connection identifier for user data packets.

22. The device of claim 18, wherein the user data packet destined to the multicast destination address is to be transmitted to a node group corresponding to a multicast group including a plurality of sub-node groups, and the routing table stores the identifiers of said plurality of virtual connections for different qualities of service which are connected to one sub-node group.

23. A method of packet transmission from a packet transmission node, comprising the steps of:
setting up different output virtual connections for a user data packet and a control packet having an identical destination address;
storing output virtual connection identifiers in correspondence to destination addresses and upper layer protocol identifiers, including identifiers of said different output virtual connections set up for a user data packet and a control packet having an identical destination address, in a routing table of the packet transmission node; and
transferring a packet to an output virtual connection determined by referring to the routing table according to a destination address and an upper layer protocol identifier of said packet.

24. The method of claim 23, wherein the storing step also stores an output interface of the packet transmission node corresponding to each output virtual connection identifier.

25. The method of claim 23, wherein the storing step also stores a next hop node address corresponding to each output virtual connection identifier.

26. The method of claim 23, wherein the storing step stores one output virtual connection identifier for control packets destined to an identical next hop node.

27. The method of claim 23, wherein the storing step stores an output virtual connection identifier of a point-to-point virtual connection connected to a multicast server for a control packet destined to a multicast destination address, and the multicast server transmits packets from said point-to-point virtual connection to a point-to-multipoint virtual connection connected to next hop nodes for said control packet.

28. The method of claim 23, wherein the storing step stores an output virtual connection identifier of a point-to-multipoint virtual connection for a plurality of control packets destined to different multicast destination addresses, said point-to-multipoint virtual connection being connected to next hop nodes for said plurality of control packets.

29. The method of claim 23, wherein the storing step stores one output virtual connection identifier for control packets destined to next hop node groups corresponding to a plurality of multicast groups, while storing one output virtual connection identifier for user data packets destined to a next hop node group corresponding to each multicast group.

30. The method of claim 23, wherein the storing step stores the output virtual connection identifiers for user data packets including identifiers of a plurality of virtual connections for different qualities of service in correspondence to a multicast destination address, and the transferring step transfers a user data packet destined to the multicast destination address to output virtual connections determined by referring to the routing table according to a destination address and an upper layer protocol identifier of the user data packet.

31. The method of claim 30, wherein the storing step stores each output virtual connection identifier for user data packets in correspondence to a source address and a destination address, and the transferring step refers to the routing table according to a source address and a destination address of the user data packet.

32. The method of claim 30, wherein the storing step also stores an output interface of the method corresponding to each output virtual connection identifier for user data packets.

33. The method of claim 30, wherein the storing step also stores a quality of service corresponding to each output virtual connection identifier for user data packets.

34. The method of claim 30, wherein the user data packet destined to the multicast destination address is to be transmitted to a node group corresponding to a multicast group including a plurality of sub-node groups, and the storing step stores the identifiers of said plurality of virtual connections for different qualities of service which are connected to one sub-node group.

* * * * *